United States Patent [19]

Harlan

[11] 4,354,202
[45] Oct. 12, 1982

[54] TELEVISION RECEIVER ON-SCREEN ALPHANUMERIC DISPLAY

[75] Inventor: Wayne E. Harlan, Indianapolis, Ind.

[73] Assignee: RCA Corporation, New York, N.Y.

[21] Appl. No.: 210,787

[22] Filed: Nov. 26, 1980

[51] Int. Cl.³ .............................................. H04N 5/22
[52] U.S. Cl. .................................................... 358/183
[58] Field of Search ......................................... 358/183

[56] References Cited

U.S. PATENT DOCUMENTS

| | | |
|---|---|---|
| 3,710,017 | 1/1973 | Abe et al. ............................ 358/183 |
| 3,812,285 | 5/1974 | Miyata et al. . |
| 3,984,828 | 10/1976 | Beyers, Jr. . |
| 4,081,797 | 3/1978 | Olson . |
| 4,145,719 | 3/1979 | Hand et al. ......................... 358/183 |
| 4,218,698 | 8/1980 | Bart et al. ........................... 358/183 |

FOREIGN PATENT DOCUMENTS

| | | |
|---|---|---|
| 1145926 | 3/1968 | United Kingdom . |
| 1198657 | 7/1970 | United Kingdom . |
| 1198658 | 7/1970 | United Kingdom . |
| 2037528 | 7/1980 | United Kingdom . |

OTHER PUBLICATIONS

RCA Television Service Data—Chassis CTC 81B Series Schematic.

Primary Examiner—Richard Murray
Attorney, Agent, or Firm—Eugene M. Whitacre; Paul J. Rasmussen; Ronald H. Kurdyla

[57] ABSTRACT

A color television receiver circuit arrangement is disclosed for facilitating the on-screen kinescope display of alphanumeric information. The receiver includes plural video output kinescope driver stages, a source of black-level reference bias voltage to which video signals amplified by the kinescope driver stages are normally referenced, and a source of control signals representative of the alphanumeric information. During picture intervals when alphanumeric information is to be displayed on a given area of the kinescope screen, the normal video signal and video driver outputs are blanked, and the control signal is employed to modify the kinescope driver black level reference bias voltage in a white level direction. The modified reference bias is sufficient to unblank the video driver outputs so that the kinescope is caused to conduct a white level signal corresponding to the alphanumeric information, which is then displayed by the kinescope.

11 Claims, 5 Drawing Figures

TELEVISION RECEIVER ON-SCREEN ALPHANUMERIC DISPLAY

This invention concerns an arrangement for applying auxiliary, alphanumeric information signals to color television receiver circuits for enabling on-screen kinescope display of the alphanumeric information.

Many color television receivers now include provision for electronic on-screen kinescope display of channel numbers so that a viewer can readily verify to which channel the receiver is tuned. Such displays are typically generated by replacing normal video information with appropriately horizontally and vertically synchronized alphanumeric signals developed by a suitable alphanumeric character generator in the receiver, so that the alphanumeric information is displayed on a given portion of the kinescope screen. One system of this type is described in U.S. Pat. No. 3,984,828—Beyers. Information displayed by such systems can include channel information and other information such as time, for example, by employing appropriate electronic control circuits in the receiver.

The system described herein advantageously provides on-screen display of alphanumeric character information independent of the normal video signal processing path, to assure that the intensity level of the alphanumeric character display is consistently at a desired level from one receiver to the next. The on-screen display also exhibits the desired intensity level independent of the setting of viewer adjustable controls such as brightness or contrast controls normally associated with the video signal processing path. The disclosed arrangement additionally permits the intensity of the character display to be tailored to suit the requirements of a particular system, without requiring an associated, compensating adjustment of the signal processing parameters of the video processing circuits.

According to the present invention, alphanumeric display control apparatus is included in a video signal processing system comprising a signal channel for processing image representative video signals, a kinescope for providing a picture display in response to video signals, and a kinescope driver stage responsive to video signals from the signal channel for supplying amplified video output signals to the kinescope. The display control apparatus includes a source of first control signals representing auxiliary alphanumeric information to be displayed by the kinescope during intervals within picture intervals of the video signal, and a source of second control signals. The second control signals are utilized for blanking video signal inputs to the kinescope driver stage during blanking intervals encompassing the alphanumeric display intervals, to then preclude passage of video signals from the signal channel to the input of the driver stage. The first control signal is coupled to the kinescope driver stage, independent of the video signal channel, with a sense and a magnitude for unblanking the output of the driver stage so that the kinescope then displays the alphanumeric information in accordance with the first control signal.

In accordance with a feature of the invention, the system also includes a source of reference bias potential coupled to the kinescope driver stage and to which video signals processed by the driver stage are normally referenced. The reference source is responsive to the first control signal for producing a modified reference bias potential during the alphanumeric display intervals, with a sense and magnitude for unblanking the output of the kinescope driver state so that the kinescope then displays the alphanumeric information in accordance with the first control signal.

Figure 1:
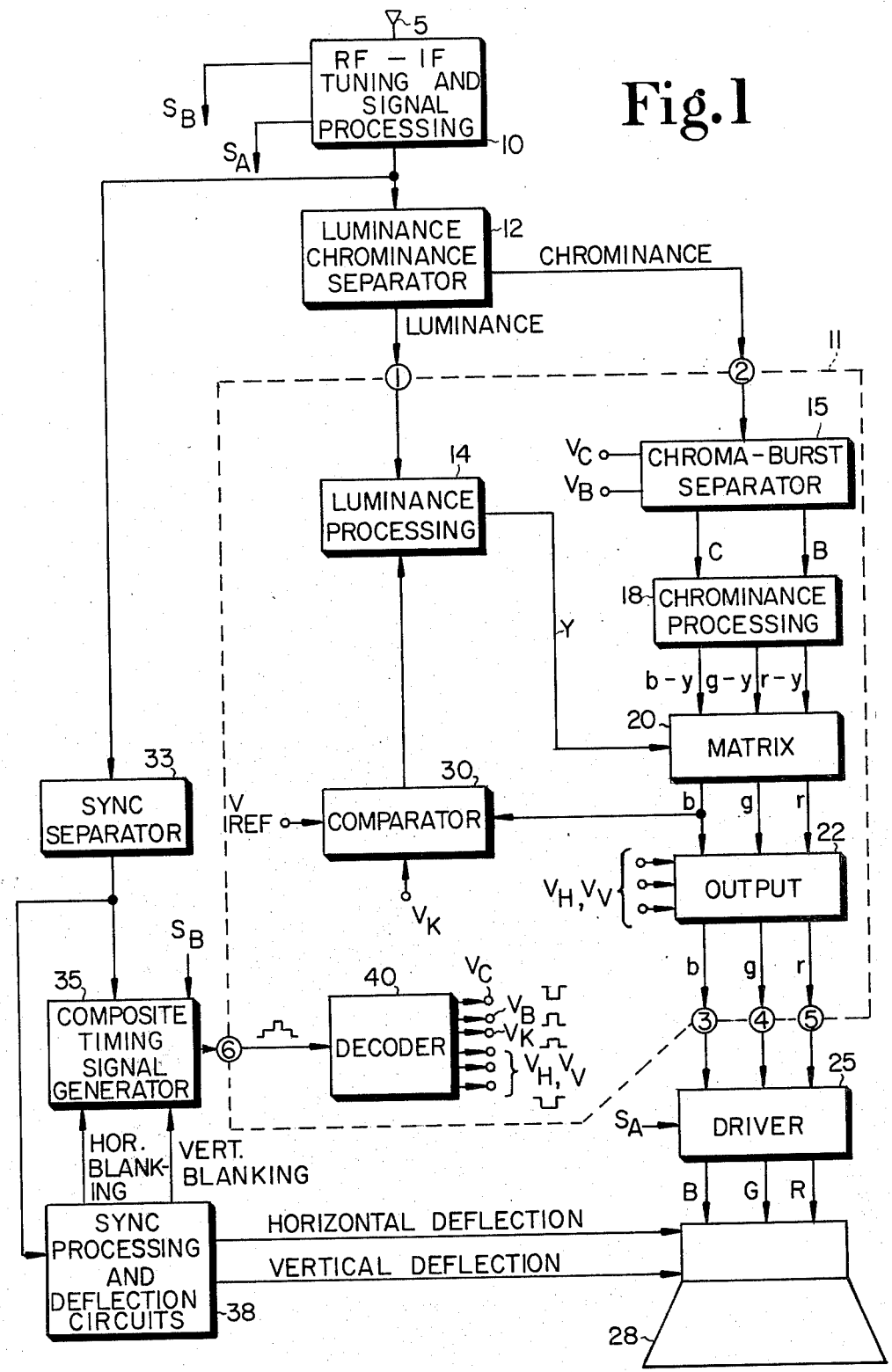
FIG. 1 shows a block diagram of a color television receiver arranged according to the present invention for on-screen display of auxiliary alphanumeric characters.

In FIG. 1, color television signals received by an antenna 5 are applied to a radio frequency (RF) and intermediate frequency (IF) tuning and signal processing unit 10, including RF and IF amplifier and video detector stages. The tuning portion of unit 10 includes a frequency selective channel selector (tuner) mechanism, and a tuner control network. The tuner control network includes means for generating a picture interval blanking control signal $S_B$ (i.e., a "black signal"), and an alphanumeric character display signal $S_A$ (i.e., a "white signal"). Signals $S_A$ and $S_B$ can be generated as described in U.S. Pat. No. 3,984,828 mentioned previously, and are used for providing on-screen alphanumeric character display as will be discussed. Signal processing unit 10 also supplies detected video signals to a luminance-chrominance signal separator 12. Separator 12 (e.g., a comb filter) separates the luminance and chrominance components of the composite television signal, and supplies these separated components to respective input terminals 1 and 2 of a luminance and chrominance signal processing network 11.

The separated luminance component is processed in a luminance channel of the receiver by a luminance signal processing unit 14 including signal peaking circuits and viewer adjustable brightness and contrast control circuits (not shown). The separated chrominance component is supplied to a keyed chrominance-burst separator 15 (e.g., as shown in U.S. Pat. No. 4,038,681—Harwood), which provides separated burst information (B) and chrominance picture interval information (C). The separated signals are then supplied to a chrominance signal processing unit 18 for developing r-y, g-y and b-y color difference signals as known. The color difference signals are combined in a signal matrix 20 with an amplified luminance output signal (Y) from unit 14, for developing output r, b and g color image signals.

The luminance channel includes a blanking level clamp comprising a keyed comparator 30 which is keyed during the burst interval of each video signal horizontal blanking interval. When keyed, comparator 30 samples and compares an adjustable brightness reference voltage $V_{REF}$ (e.g., as derived from a viewer adjustable brightness control potentiometer) with the D.C. level of the signal then appearing at the b (blue) signal output of matrix 20. An output signal from comparator 30 is supplied to a control input of luminance processor 14, for establishing the blanking level of the luminance signal (and thereby picture brightness) at a correct level in accordance with the level of voltage $V_{REF}$. The arrangement of comparator 30 with luminance processor 14 and matrix 20 is described in detail in U.S. Pat. No. 4,197,557 of A. V. Tuma, et al.

The r, g, b color signals from matrix 20 are separately coupled via plural output networks included in an output unit 22, to output terminals 3, 4 and 5 of network 11. The color signals are amplified individually by amplifiers within a kinescope driver stage 25 to provide high level output color signals R, G and B to respective intensity control electrodes of a color image reproducing kinescope 28.

Detected video output signals from unit 10 are also supplied to a sync separator 33 for deriving the horizontal line synchronizing (sync) component of the television signal. The derived sync component is supplied from an output of sync separator 33 to sync processing and deflection circuits 38. Circuits 38 provide horizontal and vertical deflection signals for application to deflection control circuits of receiver kinescope 28, and vertical and horizontal blanking timing signals.

A composite timing signal generator 35 responds to output signals from sync separator 33, to horizontal and vertical blanking timing signals from deflection circuits 38, and to control signal $S_B$ from unit 10. A composite ("sandcastle") timing signal output from generator 35 is supplied via a terminal 6 to a signal decoder 40, which decodes the composite timing signal into separate signals $V_B$, $V_C$, $V_K$ and $V_H$, $V_V$ as required by keyed signal processing circuits within network 11. Decoder 40 is shown in detail in copending U.S. patent application Ser. No. 113,371 of R. L. Shanley, II, et al., now U.S. Pat. No. 4,263,610, titled "Controlled Output Composite Keying Signal Generator For A Televsion Receiver."

Signals $V_B$ and $V_C$ encompass the burst interval and exhibit a mutually antiphase (push-pull) relationship, and are applied to keying inputs of chroma-burst separator 15. Signal $V_K$ is in-phase with and of the same (positive) polarity as signal $V_B$, and is applied to a keying input of comparator 30. Plural signals $V_H$, $V_V$ respectively occur during each horizontal and vertical image blanking interval and are applied to respective plural keying inputs of output stage 25.

In the arrangement of FIG. 1, the blocks within network 11 are largely capable of being fabricated as a single integrated circuit. In such case, terminals 1–6 correspond to external connecting terminals of the integrated circuit.

Figure 2:
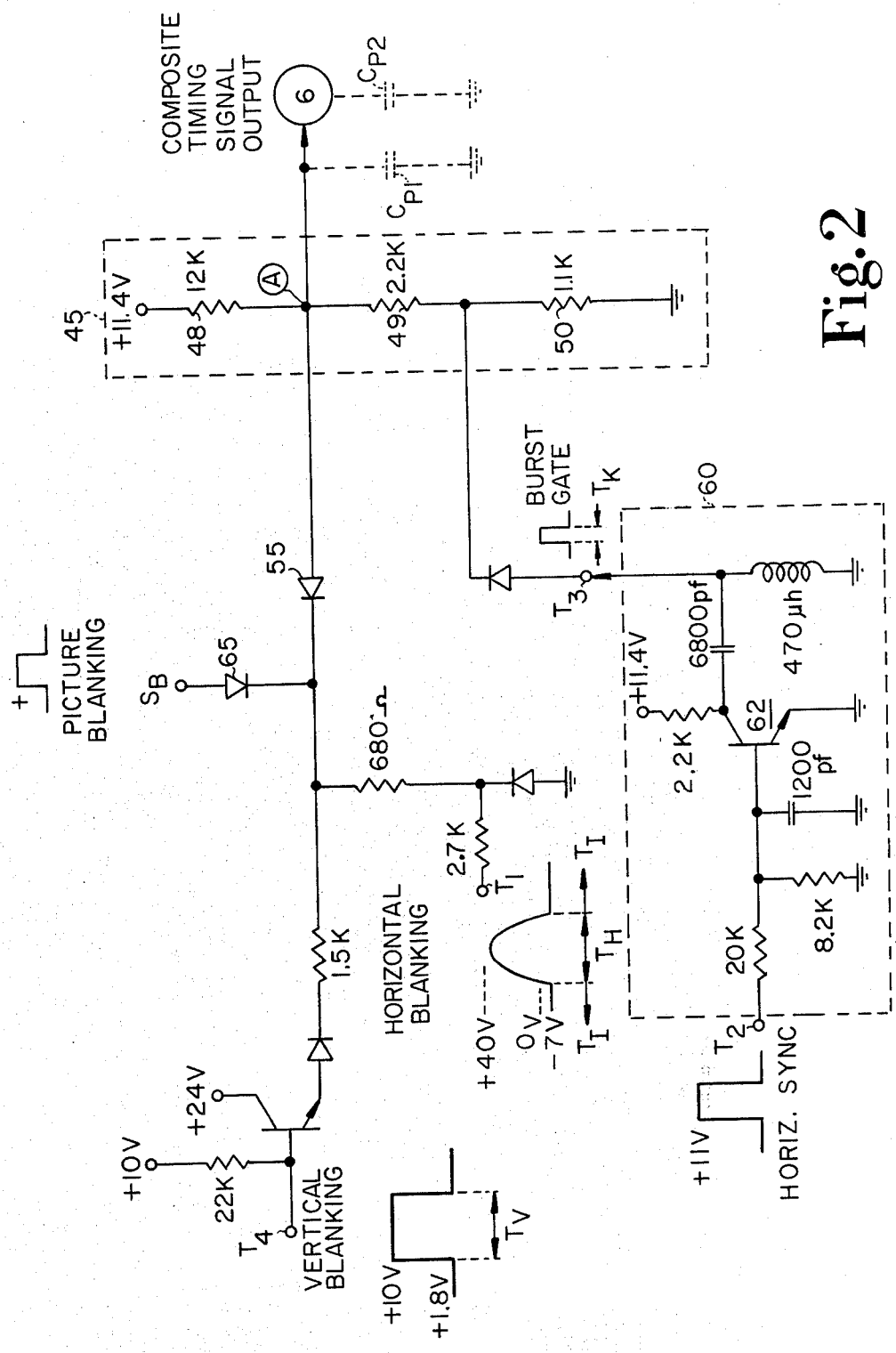
FIG. 2 illustrates a blanking signal generator circuit used in conjunction with providing on-screen character display.

FIG. 2 shows a circuit arrangement of composite timing signal generator 35 in FIG. 1, which is described in detail in my copending U.S. patent application Ser. No. 210,840 titled "Composite Timing Signal Generator with Predictable Output Level," concurrently filed herewith. Briefly, the output circuit of signal generator circuit 35 includes a resistor voltage divider 45 comprising series resistors 48, 49 and 50 coupled between a source of regulated D.C. voltage (+11.4 volts) and a reference potential (ground). A composite timing signal output from circuit 35, including first and second pulse components, is developed at a point A in voltage divider 45. Horizontal blanking timing signals from deflection circuits 38 (FIG. 1) are applied to a terminal $T_1$ of circuit 35. The horizontal timing signal comprises a positive horizontal flyback pulse blanking component which occurs during each horizontal line blanking interval $T_H$, and a negative component which occurs during each horizontal line image (picture) interval $T_1$. A diode 55 is rendered non-conductive (reverse biased) in response to the positive flyback pulse during horizontal blanking intervals $T_H$, so that a voltage level then appearing at output point A of voltage divider 45 is determined solely by the voltage divider action of resistors 48, 49 and 50. This voltage level corresponds to a blanking pedestal level associated with the first pulse component of the composite timing signal generated by circuit 35.

The second pulse component of the composite timing signal is developed by a network 60 including a normally non-conductive switching transistor 62. Transistor 62 is keyed to conduct in response to positive horizontal sync pulses supplied from sync separator 33 (FIG. 1) to a terminal $T_2$ of network 60. Network 60 develops a positive output burst gate pulse at terminal $T_3$, as described in detail in U.S. Pat. No. 4,051,518—Sendelweck. The burst gate pulse occurs over an interval $T_K$ within horizontal retrace interval $T_H$, and encompasses the color reference burst interval of the color television signal. The output gate pulse from network 60 is coupled to voltage divider 45, where the gate pulse is combined with the first (blanking) pulse component to form the composite timing signal at point A and terminal 6.

Figure 3:
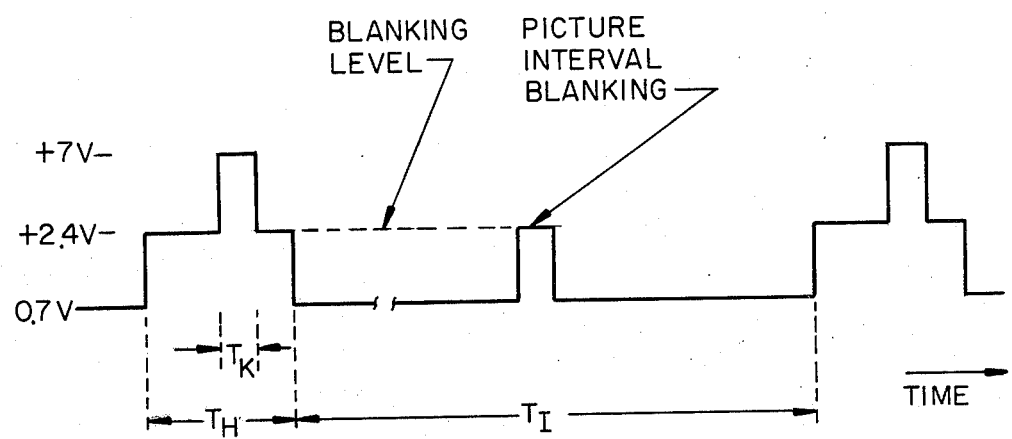
FIG. 3 depicts a signal waveform useful in understanding the operation of the circuit shown in FIG. 2.

Thus, as seen from the signal waveform of FIG. 3, the composite output timing signal developed by the circuit of FIG. 2 for horizontal timing purposes includes first and second pulse components. During each horizontal retrace blanking interval $T_H$, the first (lower) pulse component with a blanking pedestal level of +2.4 volts in this example is produced in response to the horizontal flyback pulse during interval $T_H$. The burst gate pulse from network 60 constitutes the second (upper) pulse component of the composite timing signal, and is superimposed on the first pulse component during interval $T_K$.

Analogous observations pertain with respect to generating a composite vertical rate timing signal during vertical blanking interval $T_V$, at which time a positive-going vertical blanking pulse is applied to a terminal $T_4$. Waveforms of composite timing signals developed for horizontal and vertical purposes are shown in detail in the aforementioned U.S. patent application Ser. No. 113,371 of R. L. Shanley.

The circuit of FIG. 2 also includes provision for developing an output blanking level during picture intervals. Picture interval blanking is utilized with receivers intended to provide on-screen display of alphanumeric information (e.g., time and channel information) at given times, as well as normal picture information at other times. During alphanumeric display intervals, a portion of the normal video signal image information is blanked and an auxiliary signal representative of the alphanumeric character information appears in place of the blanked video signal image information. In practice, the normal video signal information is blanked to develop a dark display background area which is slightly greater than the alphanumeric display area, to provide a "black surround" outline for highlighting the alphanumeric characters.

Picture interval blanking for on-screen display purposes is provided in response to a positive control signal $S_B$ supplied from unit 10 (FIG. 1) to diode 55 via diode 65. Signal $S_B$ is appropriately synchronized at the horizontal and vertical scanning rates and serves to reverse bias diode 55 so that a properly timed blanking level is produced at point A of voltage divider 45 in accordance with the voltage divider action of resistors 48, 49 and 50. A representative picture interval blanking signal produced in this manner during interval $T_1$ is shown in FIG. 3.

Figure 4:
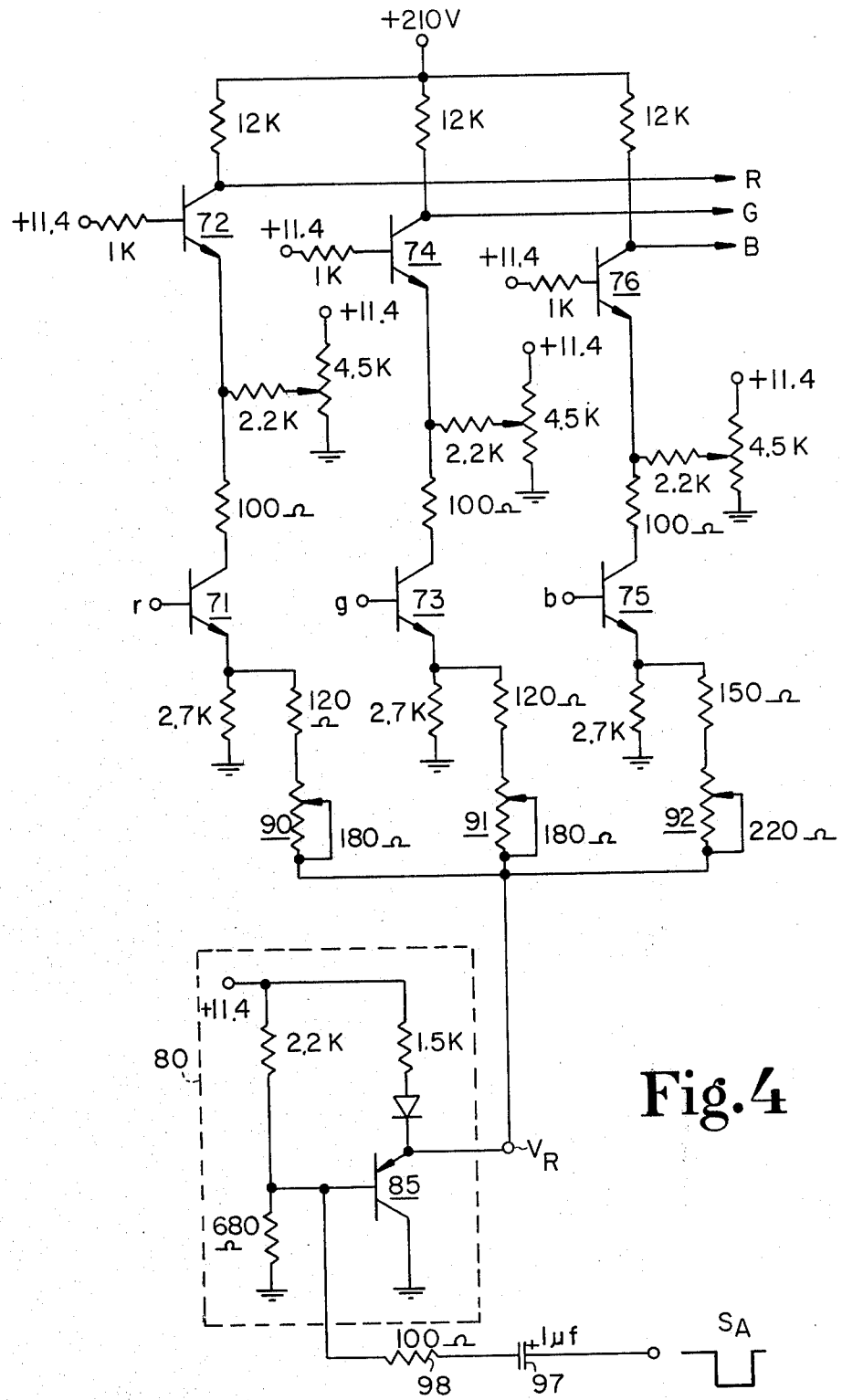
FIG. 4 shows a circuit diagram of a portion of the system of FIG. 1, including details of a circuit for enabling on-screen character displays.

Referring to FIG. 4, kinescope driver stage 25 (FIG. 1) is shown as comprising red, green and blue signal amplifiers respectively including transistor pairs 71 and 72, 73 and 74, and 75 and 76, each pair being arranged in cascode amplifier configuration. Low level r, g, b signals are applied individually to base inputs of transistors 71, 73 and 75 for developing high level R, G, B signals at collector outputs of transistors 72, 74 and 76, respectively, as shown in FIG. 5.

Figure 5:
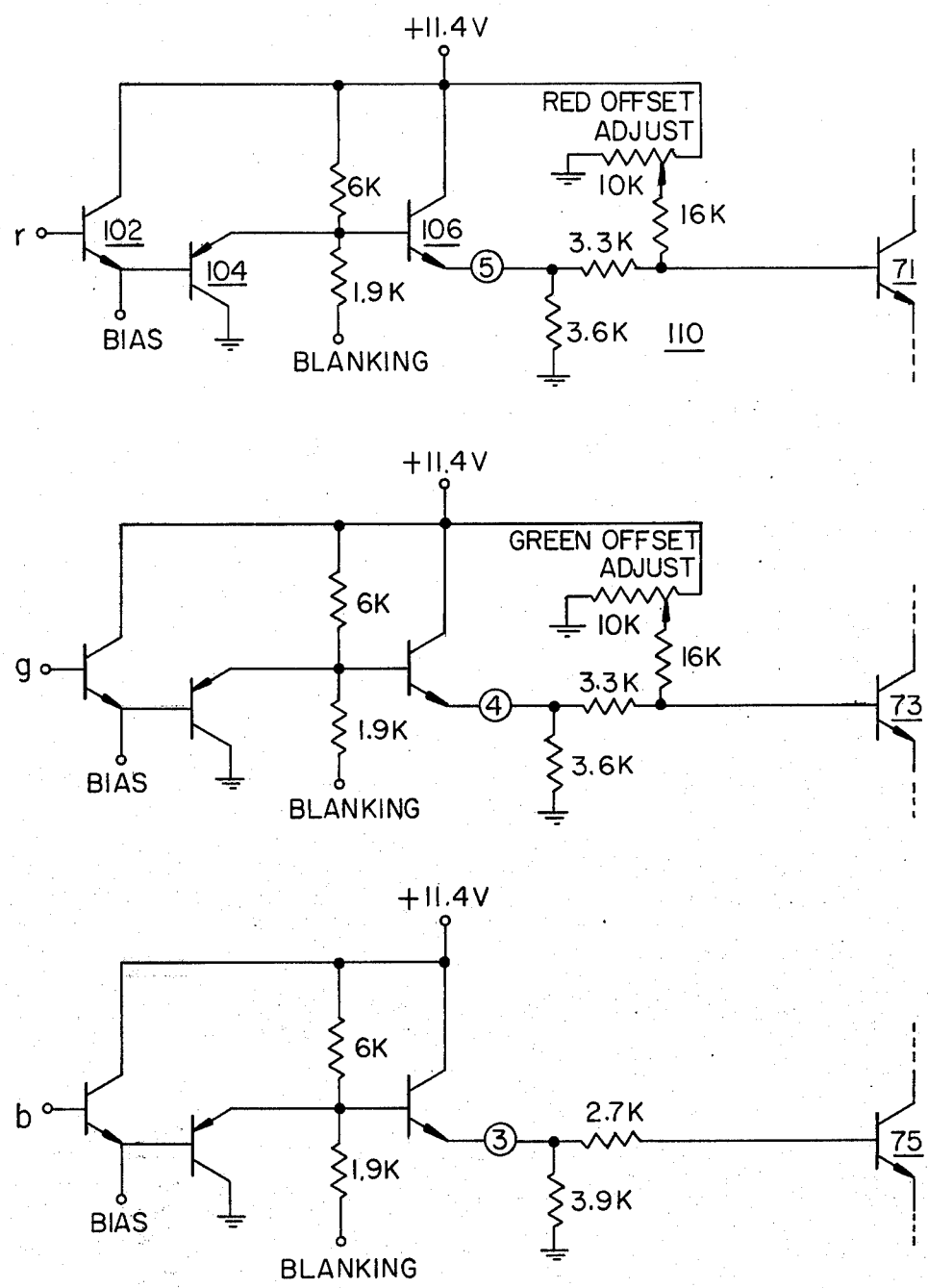
FIG. 5 shows additional details of the arrangements of FIGS. 1 and 4.

FIG. 5 depicts the manner in which the r, g and b signals from the output of matrix 20 are coupled to the inputs of amplifier transistors 71, 73 and 75 of the kinescope driver state (FIG. 4). The r signal output from matrix 20 is coupled via transistors 102, 104 and 106 which are included in output network 22 (FIG. 1), to terminal 5. Signals from terminal 5 are applied to the base input of transistor 71 via a resistor network 110. Horizontal and vertical blanking signals from the output of decoder 40 in FIG. 1, including picture interval blanking signals developed in response to signal $S_B$, are applied to the base of transistor 106 to inhibit the conduction of transistor 106 during horizontal, vertical and picture blanking intervals so that video signals are decoupled from transistor 71 at such times. Similar circuits are employed for coupling the g and b signal outputs of matrix 20 to amplifier transistors 73 and 75, respectively.

Continuing with FIG. 4, driver stage 25 also includes a bias network 80 associated in common with each of the red, green and blue signal amplifiers. Network 80 includes a PNP follower transistor 85 biased to provide a prescribed bias reference voltage $V_R$ at the emitter output of transistor 85 for normal video signal processing purposes. Reference voltage $V_R$ is coupled in common to the emitter circuits of transistors 71, 73 and 75 via respective variable signal drive adjustment resistors 90, 91 and 92. Voltage $V_R$ normally represents a reference potential to which the video signals normally amplified by the driver stage are referenced for the purpose of establishing a desired picture black level reference. Specifically, the value of voltage $V_R$ is such that substantially no signal currents flow in the color signal amplifiers and the kinescope is biased at a threshold conduction point, when the input color signals exhibit a black level picture condition and when video signals are absent. In practice, the kinescope threshold conduction point is established during initial receiver set-up (and periodically during the life of the receiver) by adjusting drive control resistors 90, 91 and 92 in a service operating mode of the receiver when video signals are decoupled from the driver stage and kinescope.

On-screen kinescope display of alphanumeric characters is accomplished by modifying the level of bias reference potential $V_R$. For this purpose a negative-going alphanumeric signal $S_A$ from unit 10 of FIG. 1, appropriately synchronized at the horizontal and vertical scanning rates, is coupled via a capacitor 97 and a resistor 98 to circuit 80. Alphanumeric signal $S_A$ is applied to the base electrode of reference transistor 85, and exhibits a given magnitude and polarity sufficient to increase the conduction of transistor 85 by a given amount. The increased conduction of transistor 85 causes the emitter voltage of transistor 85 to change (i.e., decrease) in a direction towards the collector voltage, which is at ground potential (zero volts). Reference voltage $V_R$ therefore decreases.

The decrease in reference voltage $V_R$ serves to forward bias video amplifier transistors 71, 72 and 73 for increased conduction during the on-screen display intervals when signal $S_A$ is present, which in turn causes the kinescope to "unblank" and increase conduction to produce a white image display corresponding to the alphanumeric information associated with signal $S_A$. The intensity of the alphanumeric display is a function of the magnitude of signal $S_A$, and thus may be set at any desired level (e.g., intense white through relatively darker shades of gray-scale white) by tailoring the level of signal $S_A$.

With the described on-screen display arrangement, the intensity of the display can be set consistently at a desired level. The on-screen display developed in response to signal $S_A$ is advantageously independent of the setting of viewer adjustable controls such as brightness and contrast controls, and is substantially independent of (i.e., isolated from) the normal video signal processing path since signal $S_A$ operates with respect to bias source 80 rather than with respect to the signal path used for supplying video signals to the kinescope. Thus the intensity of the on-screen display can be tailored to suit the requirements of a particular system without requiring a compensating adjustment of the signal processing parameters of the video signal processing circuits.

The described arrangement is especially useful in a television receiver with limited access to luminance and chrominance signal control points, such as in a receiver where luminance and chrominance signal processing occur primarily in an integrated circuit with a limited number of external terminals available for control purposes.

It was previously mentioned that the circuit of FIG. 2 includes provision for blanking a portion of the normal video signal during times associated with the on-screen display intervals. In this regard, it is noted that the edge detail of on-screen alphanumerics characters can be distorted by an edge 37 smearing" effect caused by a slow blanking response time between the end of the normal video signal picture information and the beginning of the on-screen picture blanking interval. In the arrangement of FIG. 2, for example, a slow blanking response time sufficient to cause edge "smear" can result from the effects of a parasitic capacitance $C_{p1}$ associated with the wiring connection between output point A and terminal 6 (e.g., on the order of five picofarads), and from the effects of a parasitic capacitance $C_{p2}$ associated with terminal 6 (e.g., on the order of five picofarads), if these parasitic capacitances are not compensated for.

The circuit of FIG. 2 is arranged to effectively eliminate the blanking delay and associated edge smear which would otherwise exist. Specifically, the values of resistors 48, 49 and 50 of output voltage divider 45 are chosen so that the effective output impedance of voltage divider 45 at output point A is low enough (approximately 2.6 kilohms) to develop a blanking time constant, together with the values of the parasitic capacitances, which is sufficient to permit rapid charging of the parasitic capacitances at the onset of the on-screen blanking interval so that the desired blanking level is attained quickly. In this example, the output time constant is approximately twenty-six nanoseconds, which is fast compared to the normally expected response times of fast video signal amplitude transitions (e.g., approximately fifty nanoseconds).

What is claimed is:

1. In a system including a signal channel for processing image representative video signals; a kinescope for providing a picture display in response to applied image representative signals; and a kinescope driver stage with an input for receiving said video signals from said channel and an output for supplying amplified video signals to said kinescope; alphanumeric display control apparatus comprising:

means for providing a first control signal representative of auxiliary alphanumeric information to be displayed by said kinescope during intervals within picture intervals of said video signal;

means for providing a second control signal for blanking video signal inputs to said kinescope driver stage during blanking intervals encompassing said alphanumeric display intervals, to then preclude passage of video signals from said channel to said input of said driver stage; and means for coupling said first control signal to said kinescope driver stage independent of said video channel, with a sense and magnitude for unblanking said output of said driver stage so that said kinescope then displays said alphanumeric information in accordance with said first control signal.

2. Apparatus in a system including a signal channel for processing image representative video signals; a kinescope for providing a picture display in response to applied image representative signals; and a kinescope driver stage with an input for receiving said video signals from said channel and an output for supplying amplified video signals to said kinescope; said apparatus comprising:

means for providing a first control signal representative of auxiliary alphanumeric information to be displayed by said kinescope during intervals within picture intervals of said video signal;

means for providing a second control signal for blanking video signal inputs to said kinescope driver stage during blanking intervals encompassing said alphanumeric display intervals, to then preclude passage of video signals from said channel to said input of said driver stage; and means for coupling said first control signal to said kinescope driver stage independent of said video channel, said coupling means comprising a source of reference bias potential coupled to said kinescope driver stage and to which video signals processed by said driver stage are normally referenced, said reference source being responsive to said first control signal for producing a modified reference bias potential during said alphanumeric display intervals, with a sense and magnitude for unblanking said output of said driver stage so that said kinescope then displays said alphanumeric information in accordance with said first control signal.

3. Apparatus in a system including a signal channel for processing image representative video signals; a kinescope for providing a picture display in response to applied image representative signals; and a kinescope driver stage with an input for receiving said video signals from said channel and an output for supplying amplified video signals to said kinescope; said apparatus comprising:

means for providing a first control signal representative of auxiliary alphanumeric information to be displayed by said kinescope during intervals within picture intervals of said video signal;

means for providing a second control signal for blanking video signal inputs to said kinescope driver stage during blanking intervals encompassing said alphanumeric display intervals, to then preclude passage of video signals from said channel to said input of said driver stage; and means for coupling said first control signal to said kinescope driver stage independent of said video channel, with a sense and magnitude for unblanking said output of said driver stage so that said kinescope then displays said alphanumeric information in accordance with said first control signal; wherein said means for providing said second, blanking control signal includes a blanking control network with an output coupled to said video signal channel via coupling path including a parasitic capacitance; and said output of said blanking control network exhibits an impedance of a magnitude so that a time constant determined by said output impedance and the value of said parasitic capacitance is fast relative to normally expected response times of video signal amplitude transitions.

4. In a color television receiver including a signal channel for processing video signals to develop plural color image representative video signals; a kinescope for providing a picture display in response to applied image representative signals; and plural kinescope driver stages each with an input for receiving respective video signals from said channel and outputs for respectively supplying amplified plural color video signals to said kinescope; alphanumeric display control apparatus comprising:

means for providing a first control signal representative of auxiliary alphanumeric information to be displayed by said kinescope during intervals within picture intervals of said video signal;

means for providing a second control signal for blanking video signal inputs to said kinescope driver stages during blanking intervals encompassing said alphanumeric display intervals, to then preclude passage of video signals from said channel to said inputs of said driver stages; and means for coupling said first control signal to kinescope driver stages independent of said video channel, with a sense and magnitude for unblanking said outputs of said driver stages so that said kinescope then displays said alphanumeric information in accordance with said first control signal.

5. Apparatus in a color television receiver including a signal channel for processing video signals to develop plural color image representative video signals; a kinescope for providing a picture display in response to applied image representative signals; and plural kinescope driver stages each with an input for receiving respective video signals from said channel and outputs for respectively supplying amplified plural color video signals to said kinescope; said apparatus comprising:

means for providing a first control signal representative of auxiliary alphanumeric information to be displayed by said kinescope during intervals within picture intervals of said video signal;

means for providing a second control signal for blanking video signal inputs to said kinescope driver stages during blanking intervals encompassing said alphanumeric display intervals, to then preclude passage of video signals from said channel to said inputs of said driver stages; and means for coupling said first control signal to said kinescope driver stages independent of said video channel, with a sense and magnitude for unblanking said outputs of said driver stages so that said kinescope then displays said alphanumeric information in accordance with said first control signal; wherein said video signal channel includes controllable means for modifying signals processed by said video channel to thereby modify the brightness of an image displayed by said kinescope, said controllable means being ineffective to modify said image brightness during intervals when said alphanumeric information is displayed in accordance with said first control signal.

6. Apparatus in a color television receiver including a signal channel for processing video signals to develop plural color image representative video signals; a kinescope for providing a picture display in response to applied image representative signals; and plural kinescope driver stages each with an input for receiving respective video signals from said channel and outputs for respectively supplying amplified plural color video signals to said kinescope; said apparatus comprising:

means for providing a first control signal representative of auxiliary alphanumeric information to be displayed by said kinescope during intervals within picture intervals of said video signal;

means for providing a second control signal for blanking video signal inputs to said kinescope driver stages during blanking intervals encompassing said alphanumeric display intervals, to then preclude passage of video signals from said channel to said inputs of said driver stages; and means for coupling said first control signal to said kinescope driver stages independent of said video channel, with a sense and magnitude for unblanking said outputs of said driver stages so that said kinescope then displays said alphanumeric information in accordance with said first control signal; wherein said means for providing said second, blanking control signal includes a blanking control network with an output coupled to said video signal channel via a coupling path including a parasitic capacitance; and said output of said blanking control network exhibits an impedance of a magnitude so that a time constant determined by said output impedance and the value of said parasitic capacitance is fast relative to normally expected response times of video signal amplitude transitions.

7. In a color television receiver including a signal channel for processing video signals to develop plural color image representative video signals; a kinescope for providing a picture display in response to applied image representative signals; and plural kinescope driver stages each with an input for receiving respective video signals from said channel and an output for respectively supplying amplified plural color video signals to said kinescope; alphanumeric display control apparatus comprising:

means for providing a first control signal representative of auxiliary alphanumeric information to be displayed by said kinescope during intervals within picture intervals of said video signal;

means for providing a second control signal for blanking video signal inputs to said kinescope driver stages during blanking intervals encompassing said alphanumeric display intervals, to then preclude passage of video signals from said channel to said inputs of said driver stages; and a source of reference bias potential coupled in common to said plural kinescope driver stages independent of said video channel and to which video signals processed by said amplifier stages are normally referenced, said reference bias source being responsive to said first control signal for producing a modified reference bias potential during said alphanumeric display intervals, with a sense and magnitude for unblanking said outputs of said driver stages so that said kinescope then displays said alphanumeric information in accordance with said first control signal.

8. Apparatus according to claim 7, wherein:

each of said kinescope driver stages comprises a transistor device normally biased by said reference potential so that said kinescope is blanked when inputs to said devices correspond to a black image level.

9. Apparatus according to claims 7 or 8, wherein:

said means for providing said second, blanking control signal includes a blanking control network with an output coupled to said video signal channel via a coupling path including a parasitic capacitance; and said output of said blanking control network exhibits an impedance of a magnitude so that a time constant determined by said output impedance and the value of said parasitic capacitance is fast relative to normally expected response times of video signal amplitude transitions.

10. Apparatus according to claim 8, wherein each of said kinescope driver stages further comprises:

plural pre-set adjustable impedance means respectively coupled to said transistor devices and to said source of reference bias potential, for establishing a desired video signal drive characteristic for said transistor devices in accordance with the setting of said impedance means.

11. Apparatus in a system including a signal channel for processing image representative video signals; a kinescope for providing a picture display in response to applied image representative signals; and a kinescope driver stage with an input for receiving said video signals from said channel and an output for supplying amplified video signals to said kinescope; said apparatus comprising:

means for providing a first control signal representative of auxiliary alphanumeric information to be displayed by said kinescope during intervals within picture intervals of said video signal;

means for providing a second control signal for blanking video signal inputs to said kinescope driver stage during blanking intervals encompassing said alphanumeric display intervals, to then preclude passage of video signals from said channel to said input of said driver stage; and means for coupling said first control signal to said kinescope driver stage independent of said video channel, said coupling means comprising a source of reference bias potential coupled to said kinescope driver stage and to which video signals processed by said driver stage are normally referenced, said reference source being responsive to said first control signal for producing a modified reference bias potential during said alphanumeric display intervals, with a sense and magnitude for unblanking said output of said driver stage so that said kinescope then displays said alphanumeric information in accordance with said first control signal; wherein said means for providing said second, blanking control signal includes a blanking control network with an output coupled to said video signal channel via coupling path including a parasitic capacitance; and said output of said blanking control network exhibits an impedance of a magnitude so that a time constant determined by said output impedance and the value of said parasitic capacitance is fast relative to normally expected response times of video signal amplitude transitions.

* * * * *